(12) United States Patent
Oizumi et al.

(10) Patent No.: US 10,292,017 B2
(45) Date of Patent: *May 14, 2019

(54) COMMUNICATION DEVICE FOR MOBILE BODY, COMMUNICATION SYSTEM FOR MOBILE BODY, AND AUTOMATIC TIME CORRECTION METHOD FEATURING COMMUNICATION DEVICE FOR MOBILE BODY

(71) Applicant: PANASONIC INTELLECTUAL PROPERTY MANAGEMENT CO., LTD., Osaka-shi, Osaka (JP)

(72) Inventors: Toru Oizumi, Osaka (JP); Takeshi Hatakeyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 24 days.

This patent is subject to a terminal disclaimer.

(21) Appl. No.: 15/362,814

(22) Filed: Nov. 28, 2016

(65) Prior Publication Data

US 2017/0127247 A1  May 4, 2017

Related U.S. Application Data

(63) Continuation of application No. 14/243,906, filed on Apr. 3, 2014, now Pat. No. 9,571,959.

(30) Foreign Application Priority Data

Apr. 5, 2013 (JP) .................................. 2013-079225
Jan. 17, 2014 (JP) .................................. 2014-006955

(51) Int. Cl.
*H04M 1/725* (2006.01)
*H04W 4/02* (2018.01)
(Continued)

(52) U.S. Cl.
CPC ............ *H04W 4/046* (2013.01); *G04R 20/14* (2013.01); *H04M 1/72572* (2013.01);
(Continued)

(58) Field of Classification Search
CPC ........ G04R 20/02; G04R 20/04; G04R 20/06; G04R 20/14; G04R 40/02; H04W 4/02;
(Continued)

(56) References Cited

U.S. PATENT DOCUMENTS 6,278,660 B1  8/2001  Tognazzini
6,414,635 B1  7/2002  Stewart et al.
(Continued)

FOREIGN PATENT DOCUMENTS

JP    2006-029960 A    2/2006

OTHER PUBLICATIONS

3GPP TS 22.042 V11.0.0, "Network Identity and TimeZone (NITZ); Service description; Stage 1 (Release 11)," Sep. 2012.
(Continued)

*Primary Examiner* — Erica Navar
(74) *Attorney, Agent, or Firm* — Shinjyu Global IP

(57) ABSTRACT

The base station, which is installed in an aircraft and is capable of communicating with a terminal, comprises a wireless communication component that can be connected to the terminal, and a controller that controls the wireless communication component. The controller acquires regional information indicating at least the destination of the aircraft, determines time zone information corresponding to regional information, produces a time correction instruction according to the time zone information, and transmits the time correction instruction through the wireless communication component to the terminal.

6 Claims, 17 Drawing Sheets

(51) Int. Cl.
  *H04W 4/04* (2009.01)
  *G04R 20/14* (2013.01)
  *G04G 9/00* (2006.01)

(52) U.S. Cl.
  CPC ............ *H04W 4/02* (2013.01); *H04W 4/027* (2013.01); *G04G 9/0076* (2013.01)

(58) Field of Classification Search
  CPC ... H04W 4/027; H04W 64/00; H04W 64/006; G04G 9/0076; G04G 21/04; G04G 5/002; G01S 19/34; G01S 13/74; G01S 13/878; G01S 19/14; G01S 5/12; G04C 9/02; H04L 67/04; H04L 67/18; H04L 67/20
  See application file for complete search history.

(56) References Cited

U.S. PATENT DOCUMENTS

2008/0031095 A1   2/2008   Matsuzaki et al.
2009/0129206 A1   5/2009   Baba
2010/0135124 A1   6/2010   Hirano

OTHER PUBLICATIONS

3GPP TS 24.008 V12.1.0, "Mobile radio interface Layer 3 specification; Core network protocols; Stage 3 (Release 12)," Mar. 2013.

Time conversion table 121

| Region | Time zone | Daylight Saving Time adjustment |
|---|---|---|
| Tokyo | UTC+9 | 0 hours |
| Los Angeles | UTC-8 | +1 hour |
| Frankfurt | UTC+1 | 0 hours |
| ... | ... | ... |

FIG. 4

COMMUNICATION DEVICE FOR MOBILE BODY, COMMUNICATION SYSTEM FOR MOBILE BODY, AND AUTOMATIC TIME CORRECTION METHOD FEATURING COMMUNICATION DEVICE FOR MOBILE BODY

PRIORITY

This application is a continuation application of U.S. application Ser. No. 14/243,906 filed on Apr. 3, 2014, which claim priority to Japanese Patent Applications No. 2013-079225 filed on Apr. 5, 2013 and No. 2014-006955 filed on Jan. 17, 2014. The entire disclosure of U.S. application Ser. No. 14/243,906 and Japanese Patent Applications No. 2013-079225 and No. 2014-006955 are hereby incorporated herein by reference.

BACKGROUND

Technical Field

The present disclosure relates to technology for correcting time information in a terminal located in a mobile body, on the basis of information from a base station located in the mobile body.

Background Art

There has been known a technique for automatically revising the clock time of a terminal to a time based on the standard time of the region where the terminal is used, by making use of position information from GPS or the like. This technique is disclosed by, for example, Japanese Laid-Open Patent Application 2006-029960, and the following non-patent literatures.
Non-Patent Literature 1: 3GPP TS22.042 V11.0.0, "Network Identity and Time Zone (NITZ); Service description; Stage 1 (Release 11)," September 2012, and
Non-Patent Literature 2: 3GPP TS24.008 V12.1.0, "Mobile radio interface Layer 3 specification; Core network protocols; Stage 3 (Release 12)," March 2013

SUMMARY

This disclosure provides a communication device, a communication system, and an automatic time correction method that are effective at correcting the time information of a terminal used in a mobile body that is a means of transportation.

According to a first aspect of this disclosure, a communication device is provided in a mobile body which is a means of transportation, and is capable of communicating with another communication device. The communication device comprises a communication component that can be connected to the other communication device, and a controller that controls the communication component. The controller acquires regional information indicating at least the destination of the mobile body, determines time zone information corresponding to the regional information, produces a time correction instruction according to the time zone information, and transmits the time correction instruction through the communication component to the other communication device.

According to a second aspect of this disclosure, an automatic time correction method uses a communication device that is provided in a mobile body which is a means of transportation, and that is capable of communicating with another communication device. The automatic time correction method includes, while the mobile body is traveling toward its destination, acquiring regional information indicating the destination; determining zone information corresponding to the regional information; producing a time correction instruction according to the time zone information; transmitting the time correction instruction to the other communication device; and correcting the time of the other communication device according to this time correction instruction.

The communication device, the communication system, and the automatic time correction method in this disclosure are effective at correcting time information for a terminal used in a mobile body that is a means of transportation.

BRIEF DESCRIPTION OF THE DRAWINGS

FIG. 4 is a diagram giving an example of a time conversion table 121.

DETAILED DESCRIPTION

Embodiments will now be described in detail through reference to the drawings. However, unnecessarily detailed description may be omitted in some cases. For instance, detailed description of already known facts or redundant description of components that are substantially the same may be omitted. This is to avoid unnecessary repetition in the following description, and facilitate an understanding on the part of a person skilled in the art. It will be apparent to those skilled in the art from this disclosure that the following descriptions of the embodiments are provided for illustration only and not for the purpose of limiting the invention as defined by the appended claims and their equivalents.

The inventor(s) has provided the appended drawings and the following description so that a person skilled in the art might fully understand this disclosure, but does not intend for these to limit what is discussed in the patent claims.

Embodiment 1

Embodiment 1 will now be described through reference to FIGS. 1 to 7.

1-1. Configuration 1-1-1. Configuration of In-Flight System 10

Figure 1:
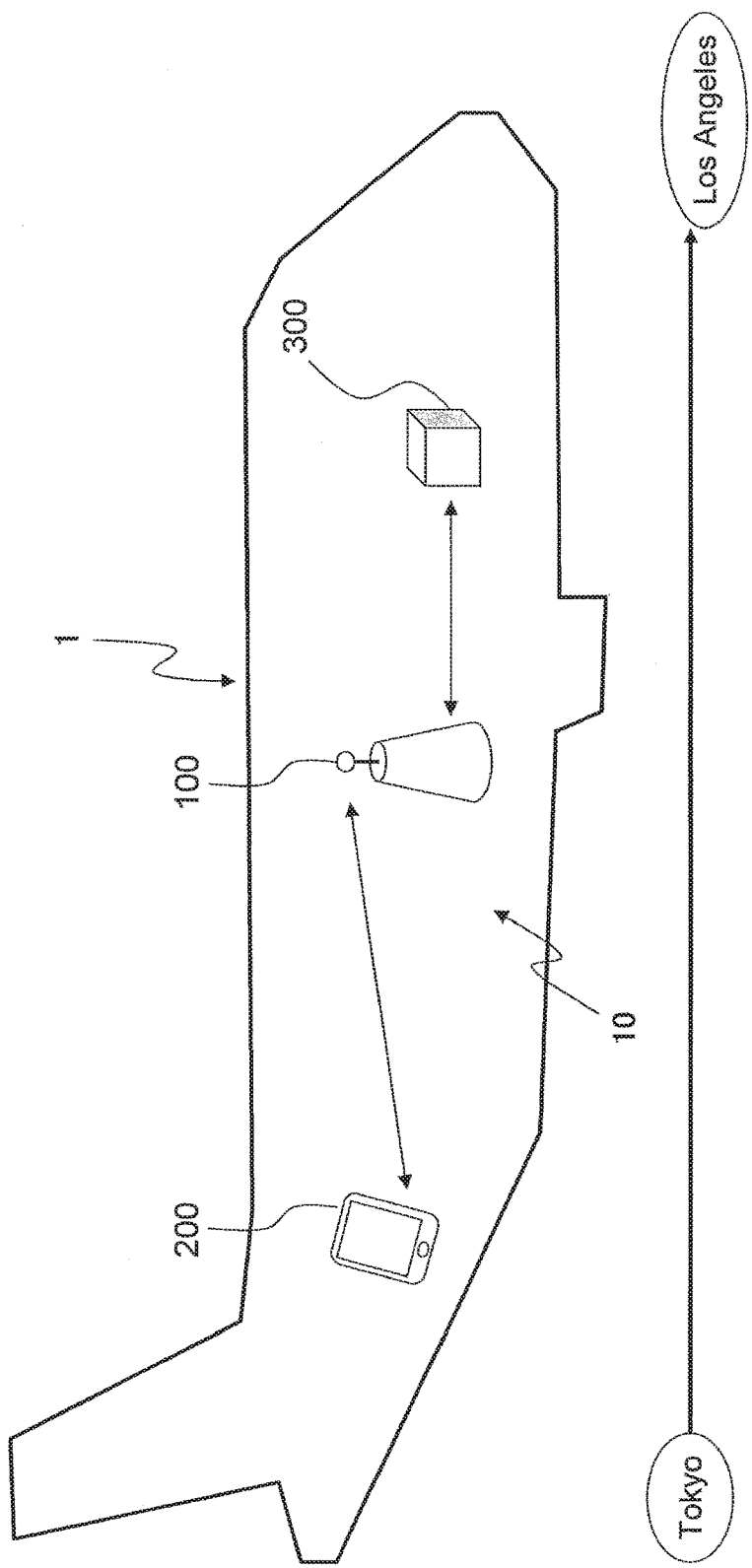
FIG. 1 is a simplified diagram of an in-flight system.

As shown in FIG. 1, in Embodiment 1, an aircraft 1 is used as an example of a mobile body, and the description will focus on a base station 100 located in the aircraft 1, and a terminal 200 that can be wirelessly connected to the base station 100. As shown in FIG. 1, the aircraft 1 comprises the in-flight system 10 (an example of a communication system), which includes the base station 100 (an example of a communication device), the terminal 200 (an example of another communication device) that is wirelessly connected to the base station 100, and a server 300 that is connected by cable or the like to the base station 100.

The terminal 200 can correct time information on the basis of information from the base station 100. In the depicted example, just one terminal 200 is shown for the sake of easy-to-understand explanation, but actually the terminal 200 is owned by a passenger, and the base station 100 can connect to a plurality of terminals 200.

When connection with the terminal 200 has been established, the base station 100 individually instructs the terminal 200 to correct the time set on the terminal. More specifically, the base station 100 sends each terminal 200 connected to the base station 100 an IE (information element) defined by the NITZ (network identify and time zone). The IE is made up of an IEI (information element indicator) that is one byte long and used for identifying information sent from the base station to the terminal, and an information portion that is uniquely set for every IEI. For instance, if the IEI is 46, the corresponding information portion is the time difference in 15 minute increments from world standard time (that is, the local time zone (LTZ)). The time zone can also include Daylight Saving Time, or adjustment for summer time, which will be discussed below. If the IEI is 49, the corresponding information portion is a Daylight Saving Time adjustment of any of 0 hours, +1 hour, or +2 hours. When the IEI is 47, the corresponding information portion is world standard time and the time difference in 15 minute increments from world standard time (time zone). As discussed above, when the IE is sent, the base station 100 issues a time correction instruction to the terminal 200.

1-1-2. Configuration of Base Station 100

The base station 100 is located in the aircraft 1, and transmits time correction instructions to the terminal 200 as discussed below. The time in the region where the base station 100 is used is different from the time at the destination. That is, the base station 100 provides information about the time at the destination to the terminal 200 prior to reaching the destination.

The base station 100 functions as a base station for mobile phones, for example, and executes communication with the terminal 200 in a mobile phone network configured along with the terminal 200, which is a wireless communication device that conforms to standards such as 3GPP.

Figure 2:
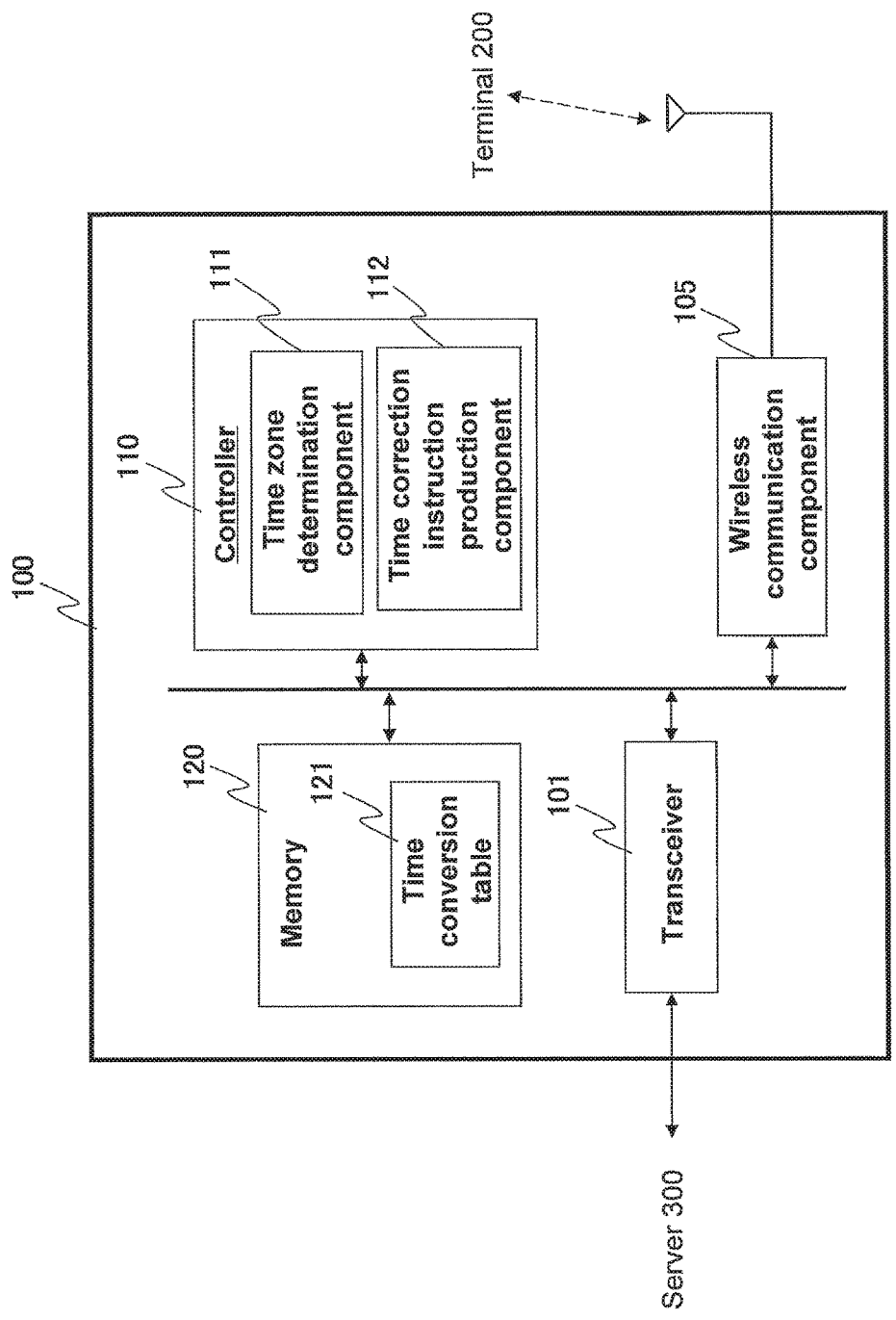
FIG. 2 is a diagram of the simplified configuration of a base station.

As shown in FIG. 2, the base station 100 is a communication device that comprises a transceiver 101, a controller 110 (an example of a controller), a memory 120, a wireless communication component 105 (an example of a communication component), and so forth, which are connected to one another via a specific bus. The transceiver 101 is connected to the server 300. The controller 110 includes a CPU or other processor, and executes a specific program. In particular, the controller 110 executes the automatic time correction processing pertaining to this embodiment by executing the function of a time zone determination component 111 and a time correction instruction production component 112 (discussed below). The memory 120 stores various kinds of data, such as the communication status of the device, and information about connection to other communication devices. The memory 120 also holds a time conversion table 121 (discussed below). The wireless communication component 105 is connected to a wireless antenna, and communicates with the terminal 200.

Figure 3:
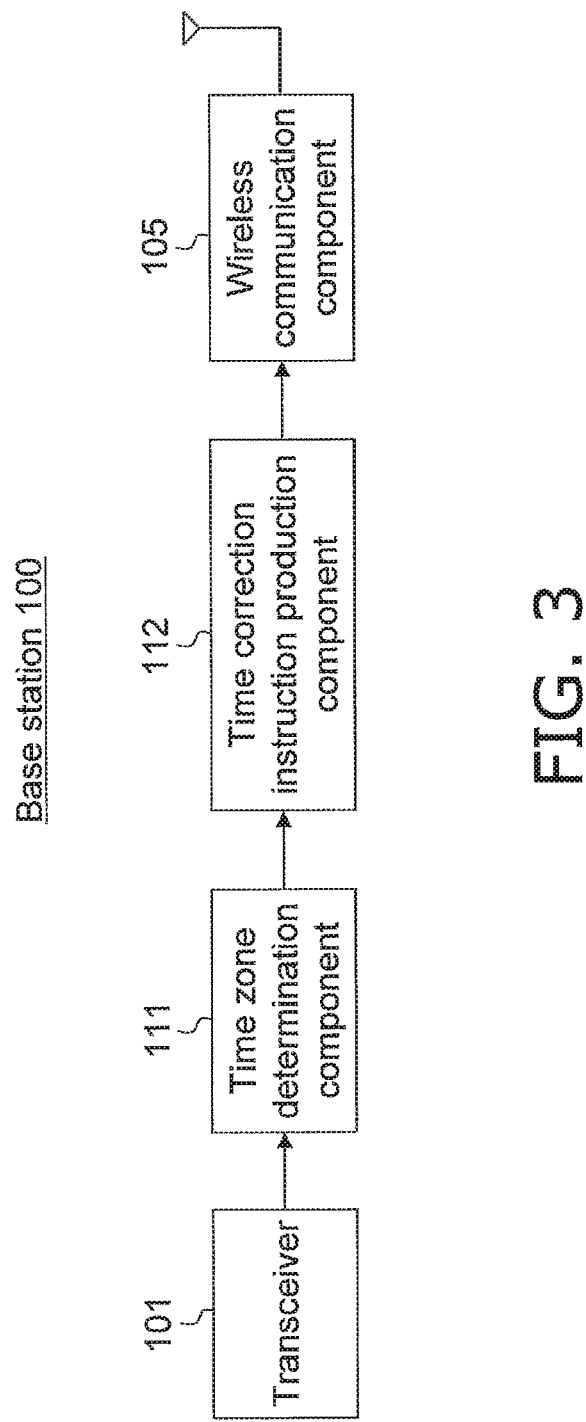
FIG. 3 is a functional block diagram of the base station.

FIG. 3 is a functional block diagram of the base station 100 pertaining to Embodiment 1.

The transceiver 101 receives destination information about the aircraft 1 (an example of regional information) from the server 300. The destination information includes information specifying the destination of the aircraft 1. The received destination information is output to the time zone determination component 111.

The time zone determination component 111 refers to the time conversion table 121 held in the memory 120 and determines the time zone for the received destination information.

As shown in FIG. 4, the time conversion table 121 holds time zones and Daylight Saving Time adjustments for each region. The time zone determination component 111 uses the time conversion table 121 to determine the time zone and Daylight Saving Time adjustment of the destination of the aircraft 1, with respect to the destination information input from the transceiver 101. The time zone determination component 111 then outputs the time zone and Daylight Saving Time adjustment for the destination of the aircraft 1 to the time correction instruction production component 112.

The time correction instruction production component 112 produces a time correction instruction defined by an NITZ (network identify and time zone), on the basis of the time zone and Daylight Saving Time adjustment determined by the time zone determination component 111. That is, the time correction instruction production component 112 produces the IE defined by the NITZ, and outputs it as a time correction instruction to the wireless communication component 105.

The wireless communication component 105 sends the time correction instruction input from the time correction instruction production component 112 to the connected terminal 200.

1-1-3. Configuration of Terminal

Figure 5:
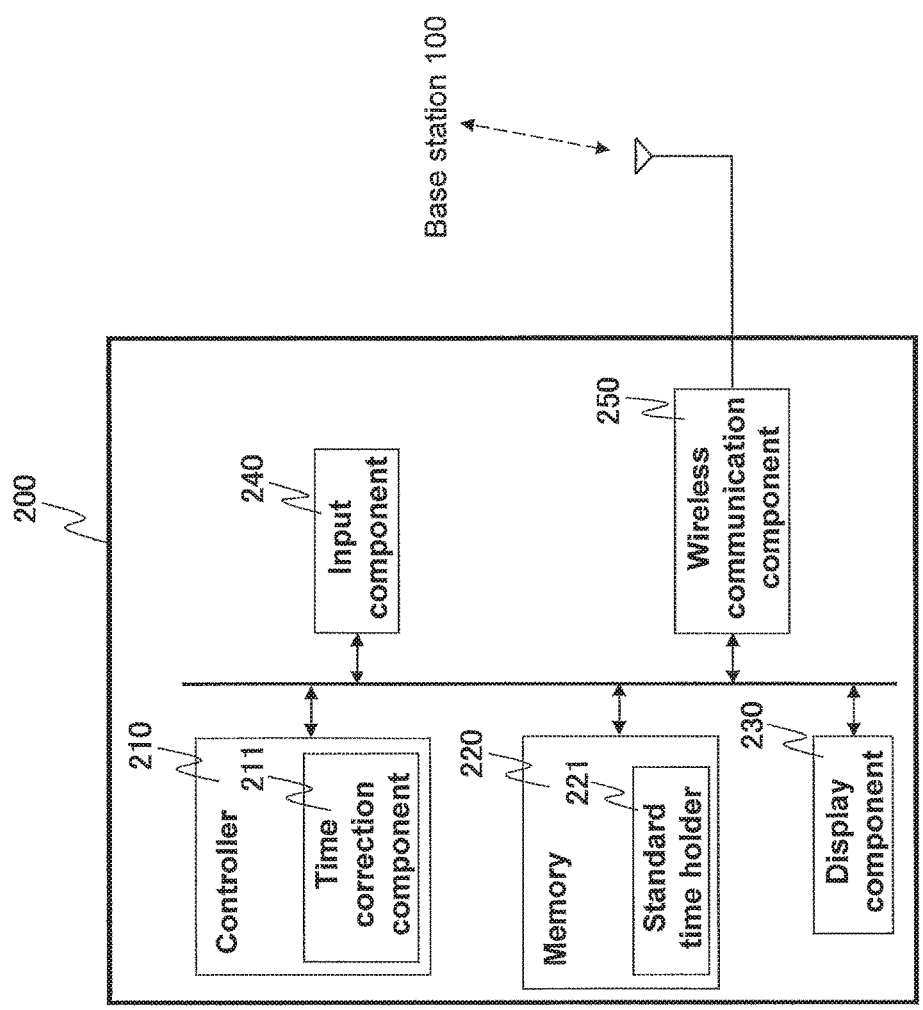
FIG. 5 is a block diagram of the simplified configuration of a terminal.

The terminal 200 is a smart phone, tablet terminal, laptop computer, or other such terminal carried by a passenger. As shown in FIG. 5, the terminal 200 comprises a controller 210, a memory 220, a display component 230, an input component 240, and a wireless communication component 250 that are connected via a specific bus, and runs software that carries out various functions called applications with an operating system such as Windows, Android, or iOS.

The controller 210 includes a CPU or other processor, and executes the various functions of the terminal 200 by executing a specific program. The controller 210 executes the function of a time correction component 211 according to a time correction instruction received from the base station 100. The memory 220 includes a standard time holder 221, and also holds various other kinds of data. The display component 230 has an LCD, an organic EL display, or another such display screen, and displays information corresponding to the instructions of the controller 210. The input component 240 is an input means such as a mouse, a keyboard, control buttons, or a touch panel displayed on the display component 230, and is operated by the user to send the input information to the controller 210. The wireless communication component 250 sends and receives commands, responses, and other such signals and data wirelessly to and from the base station 100.

Figure 6:
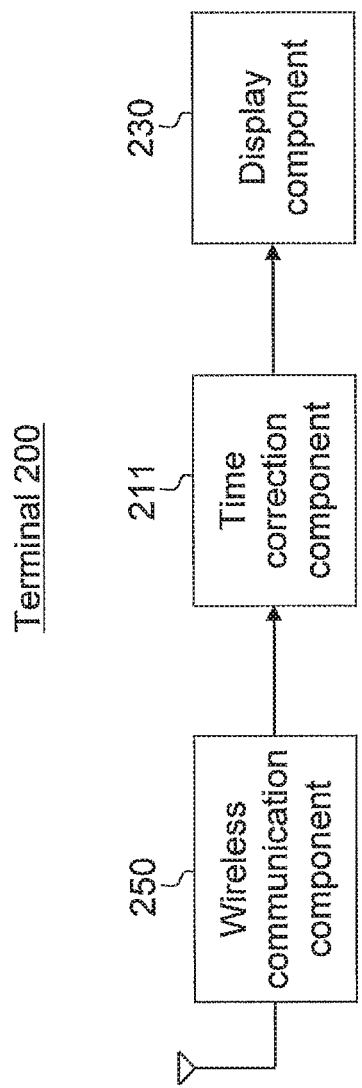
FIG. 6 is a functional block diagram of the terminal.

FIG. 6 is a functional block diagram of the terminal 200 pertaining to Embodiment 1.

The wireless communication component 250 receives a time correction instruction from the base station 100.

The time correction component 211 decodes the time zone (including Daylight Saving Time adjustment) included in the received time correction instruction, and acquires standard time information from the standard time holder 221. The standard time is, for example, Coordinated Universal Time (UTC) (or it may be Greenwich Mean Time (GMT)). The time correction component 211 corrects the current time on the basis of the acquired time zone and standard time information, and outputs the corrected time to the display component 230.

The display component 230 displays the corrected time produced by the time correction component 211.

1-2. Operation

Figure 7:
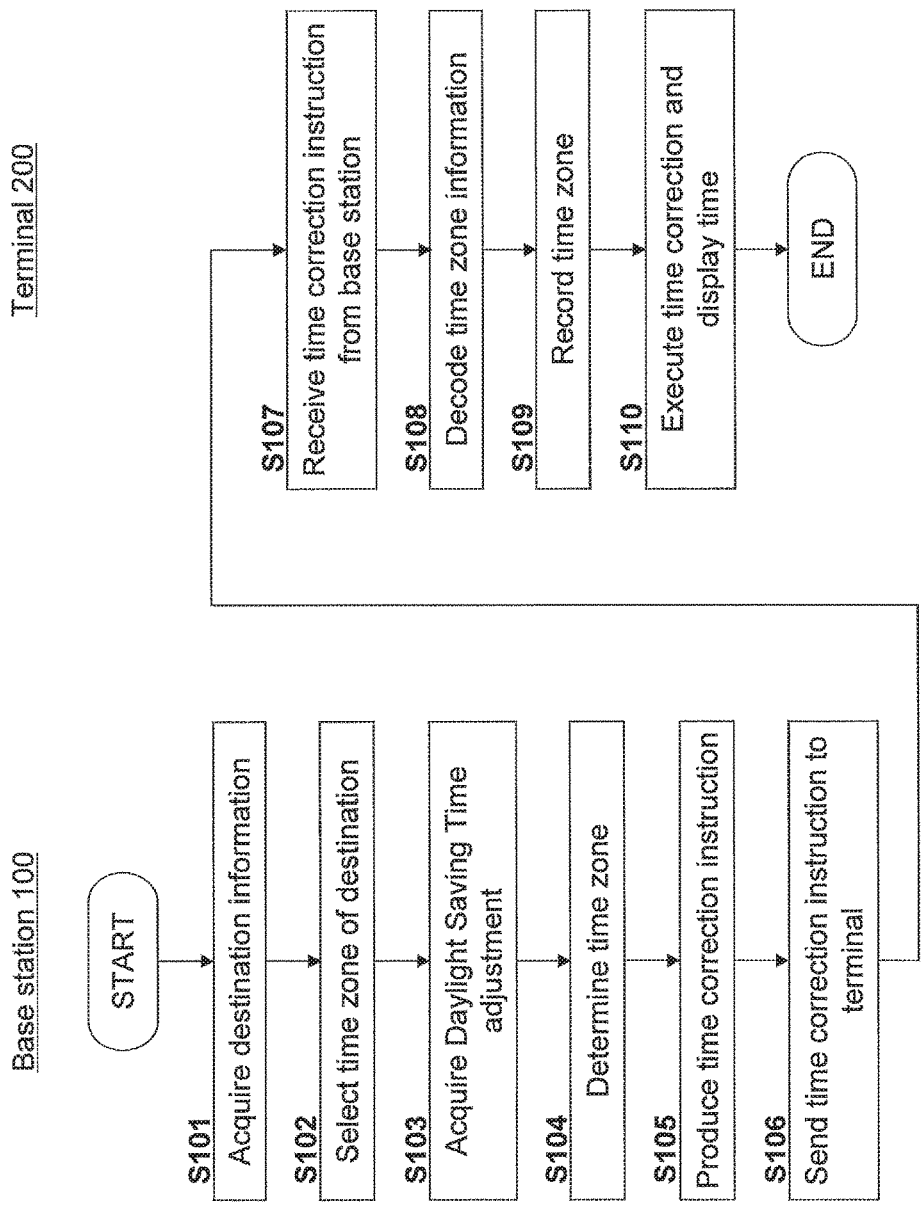
FIG. 7 is a flowchart of the operation of the base station and terminal.

The operation of the base station 100 and the terminal 200 pertaining to Embodiment 1 will be described in detail through reference to FIG. 7. In this embodiment, an example will be described in which the aircraft 1 is departing from Tokyo and will arrive in Los Angeles, as shown in FIG. 1.

First, the detailed operation of the base station 100 pertaining to Embodiment 1 will be described.

Step S101: The controller 110 of the base station 100 acquires destination information (such as Los Angeles) for the aircraft 1 from the server 300. The reception of the destination information from the server 300 may be accomplished by having the server 300 respond to a request from the base station 100. Alternatively, the destination information may be received ahead of time from the server 300, such as when the system is started up, and then read from the memory 120.

Step S102: The controller 110 (the time zone determination component 111) refers to the memory 120, uses the time conversion table 121 for the time zone and Daylight Saving Time adjustment for each region, and selects "UTC −8" (Universal Coordinated Time −8 hours) (or it may be GMT (Greenwich Mean Time) −8 hours) as the time zone corresponding to the destination of Los Angeles.

Step S103: The controller 110 (the time zone determination component 111) acquires the Daylight Saving Time adjustment corresponding to the destination. In this embodiment, the Daylight Saving Time adjustment corresponding to the destination Los Angeles is "+1 hour."

Step S104: The controller 110 (the time zone determination component 111) totals up the time zone and the Daylight Saving Time adjustment to calculate the time zone (including Daylight Saving Time adjustment) corresponding to the destination Los Angeles, which will be "UTC −7," and sets this as the time zone. The time zone thus set may be stored in the memory 120.

Step S105: The controller 110 (the time correction instruction production component 112) produces a time correction instruction defined by NITZ on the basis of the time zone (including the Daylight Saving Time adjustment) of the destination determined by the time zone determination component 111. More specifically, the controller 110 (the time correction instruction production component 112) produces as the time correction instruction an IE including the time zone of the destination (including the Daylight Saving Time adjustment), defined by IEI=46. That is, the base station 100 produces an instruction to correct to the time for the destination, which is different from that of the region where the base station 100 is used (Tokyo in this example).

Step S106: The controller 110 sends the time correction instruction thus produced through the wireless communication component 105 to the connected terminal 200.

Here, the information the base station 100 sends to the terminal 200 is the time zone of the destination (including the Daylight Saving Time adjustment). Specifically, the base station 100 does not need to send the terminal 200 detailed time information, such as information about the hours, minutes, and seconds of world standard time. Thus, few bits of information need to be sent from the base station 100 to the terminal 200. Also, since the time correction instruction is given individually to each terminal, the more terminals there are on the aircraft 1, the greater the effect of lowering overhead related to communication will be as a result of reducing the number of bits. Furthermore, since there is no need to send detailed time information to the terminal 200, the base station 100 does not have to hold detailed time information. Accordingly, the effect is that the configuration of the base station 100 can be simplified.

In Embodiment 1, an example was given of moving between different time zones (from Tokyo to Los Angeles), but this is not the only option. If the mobile body is moving between regions in which the time zone is the same and only the Daylight Saving Time adjustment is different, the base station 100 may produce as the time correction instruction an IE including the Daylight Saving Time adjustment of the destination, defined by IEI=49, and sent it to the terminal 200.

Also, in Embodiment 1, the time correction instruction was produced with a single IE (IEI=46) that combined the time zone and the Daylight Saving Time adjustment. Alternatively, separate time correction instructions may be produced: a time correction instruction with an IE including the time zone defined by IEI=46 and a time correction instruction with an IE including a Daylight Saving Time adjustment defined by IEI=49. In this case, the time correction instructions are sent to the terminal 200, and adjustment for Daylight Saving Time is performed on the terminal 200 side.

If the base station 100 has hour, minute, and second information about the world standard time as detailed time information, an IE including world standard time and the time zone (and the Daylight Saving Time adjustment) of the destination, defined by IEI=47, may be produced as the time correction instruction and sent to the terminal 200.

Next, the detailed operation of the terminal 200 pertaining to Embodiment 1 will be described. For the sake of description, it is assumed that a time based on the time zone "UTC +9" (such as Tokyo time) is being displayed at the point prior to reception of an instruction to correct the time to the time of the destination Los Angeles sent from the base station 100.

Step S107: The controller 210 of the terminal 200 carried in the aircraft 1 receives a time correction instruction sent out by the base station 100.

Step S108: The controller 210 decodes the time zone information "UTC −7" acquired from the received time correction instruction.

Step S109: The controller 210 records the decoded time zone information "UTC −7" to the memory 220.

Step S110: The controller 210 changes the current time it is holding to the time based on the time zone information "UTC −7," and displays the new time on the display component 230.

The terminal 200 may cancel the time zone information "UTC +9" from before the time correction, or in addition to displaying a time based on "UTC −7" as a first time, it may hold a time based on "UTC +9" as a second time and display both times on the display component 230.

1-3. Effects, Etc.

As discussed above, according to Embodiment 1, a time correction instruction including time zone information for the destination is produced and sent from the base station 100 located in an aircraft. Accordingly, the user (a passenger) can automatically correct the time displayed on the terminal 200 to the time at the destination, without having to register the departure time or reset the time that had been set on the terminal 200 carried by the user.

Also, the base station 100 can automatically correct the time on the terminal 200 to the time at the destination while heading toward the destination.

Also, the base station 100 does not need to send the terminal 200 detailed time information for the destination (such as hour, minute, and second information about world standard time). Consequently, the number of bits of data sent by the base station 100 to the terminal 200 can be reduced, which lowers the overhead related to communication.

Furthermore, the base station 100 does not need to send detailed information about the current time to the terminal 200, so detailed time information does not have to be stored for time correction. Accordingly, the configuration and function of the base station 100 can be simplified.

Embodiment 2

Embodiment 2 will now be described through reference to FIGS. 8 to 12.

In this embodiment, if there is interference between the radio waves of a base station 500 located in the aircraft 1 (mobile body) and the radio waves of a ground base station 400 located near the departure site before the aircraft 1 has taken off from the departure site (or immediately after departure), correction of time information at the terminal 200 will still be carried out without any problem.

Those elements having the same configuration and function as in Embodiment 1 will be numbered the same and referred to in the same drawings, and will not be described again in detail.

Figure 8:
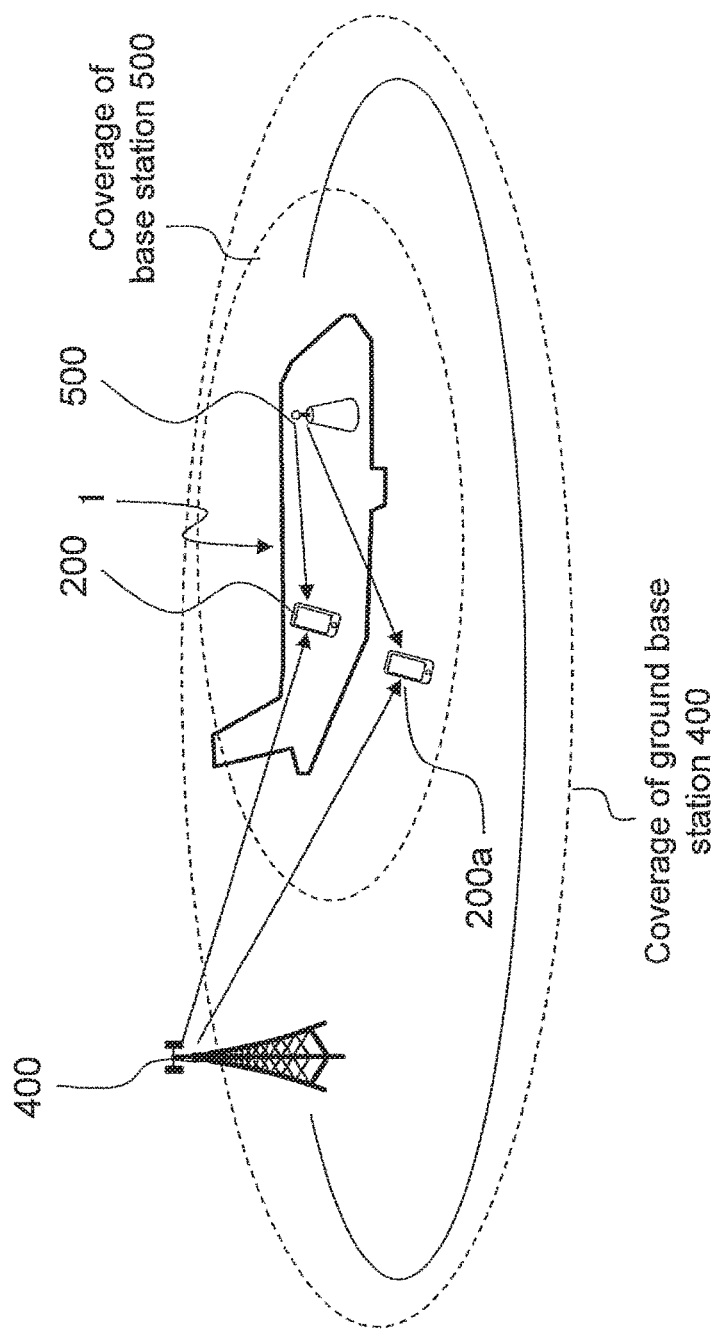
FIG. 8 is a diagram illustrating Embodiment 2.
Figure 9:
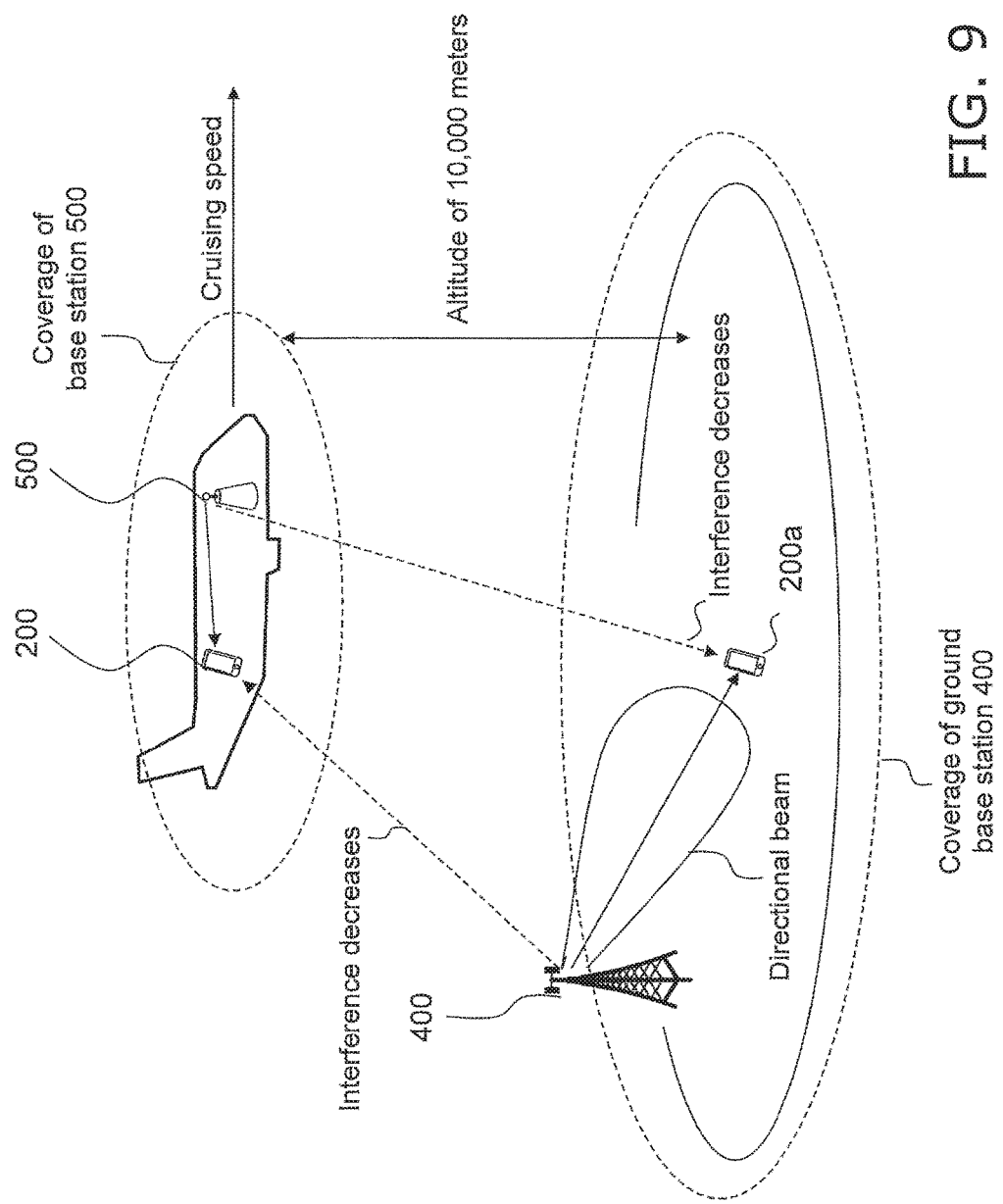
FIG. 9 is a diagram illustrating Embodiment 2.

FIGS. 8 and 9 show examples of the state of radio wave interference in the aircraft 1 pertaining to Embodiment 2.

As shown in FIGS. 8 and 9, the ground base station 400 is located near the departure region of the aircraft 1. The ground base station 400 uses the technology (NITZ) discussed in Non-Patent Literature 1 and Non-Patent Literature 2 and sends the time of the region where the ground base station 400 is located (that is, the departure region) to a terminal 200 that is connected to the ground base station 400.

FIG. 8 shows how the ground base station 400 located near the departure region and the base station 500 located in the aircraft 1 communicate with the terminal 200 located in the aircraft 1 and a terminal 200*a* outside the aircraft 1, before the aircraft 1 has taken off from the departure site (or immediately after departure).

FIG. 9 shows how the ground base station 400 located near the departure region and the base station 500 located in the aircraft 1 communicate with the terminal 200 in the aircraft 1 and the terminal 200*a* outside the aircraft 1, when the aircraft 1 is at a high altitude (such as an altitude of about 10,000 meters) after having taken off from the departure site.

As shown in FIG. 8, when the aircraft 1 is at a low altitude, such as before or immediately after departure, the terminal 200 in the aircraft 1 is within the radio wave range of the ground base station 400 in the departure region, and receives a strong signal from the ground base station 400. Accordingly, the terminal 200 in the aircraft 1 can receive signals from the ground base station 400. Therefore, when the base station 500 in the aircraft 1 sends out the time of the destination region at a low altitude, the terminal 200 in the aircraft 1 receives the time in the departure region from the ground base station 400, and also receives the time at the destination from the base station 500 in the aircraft 1.

At this point, it is possible that the times in the departure region and the destination region will end up being corrected frequently. This same problem occurs at the terminal 200*a* outside the aircraft and near the fuselage. Accordingly, if the base station 500 in the aircraft 1 sends the time for the destination region at a low altitude, the time displayed on the terminal 200 in the aircraft 1 and the terminal 200*a* outside the aircraft 1 will be switched frequently, which can be confusing to the users of the terminals 200 and 200*a*.

Meanwhile, as shown in FIG. 9, if the aircraft 1 is at a high altitude (such as an altitude of about 10,000 meters), the signal received by the terminal 200 in the aircraft 1 from the ground base station 400 will be weaker than the signal received from the base station 500 in the aircraft 1. The reason for this is that electromagnetic waves are attenuated in proportion to the distance they propagate from the ground base station 400 to the terminal 200 in the aircraft 1, and that the directionality of the antenna of the ground base station 400 is facing the ground. Accordingly, there is a lower probability that the terminal 200 in the aircraft 1 will connect to the ground base station 400 at such a high altitude. Also, for the base station 500 in the aircraft 1 to communicate with the terminal 200 in the aircraft 1, the base station 500 in the aircraft 1 only has to output a signal that is strong enough to cover the interior of the aircraft 1. Accordingly, there is also a lower probability that the base station 500 in the aircraft 1 will affect the terminal 200*a* outside the aircraft 1.

In light of the above, in Embodiment 2, the base station 500 installed in the aircraft 1 only sends an instruction to correct to the time at the destination to a terminal 200 carried in the aircraft 1 when the aircraft 1 has taken off and has reached a certain altitude (such as 10,000 meters).

2-1. Configuration

Figure 10:
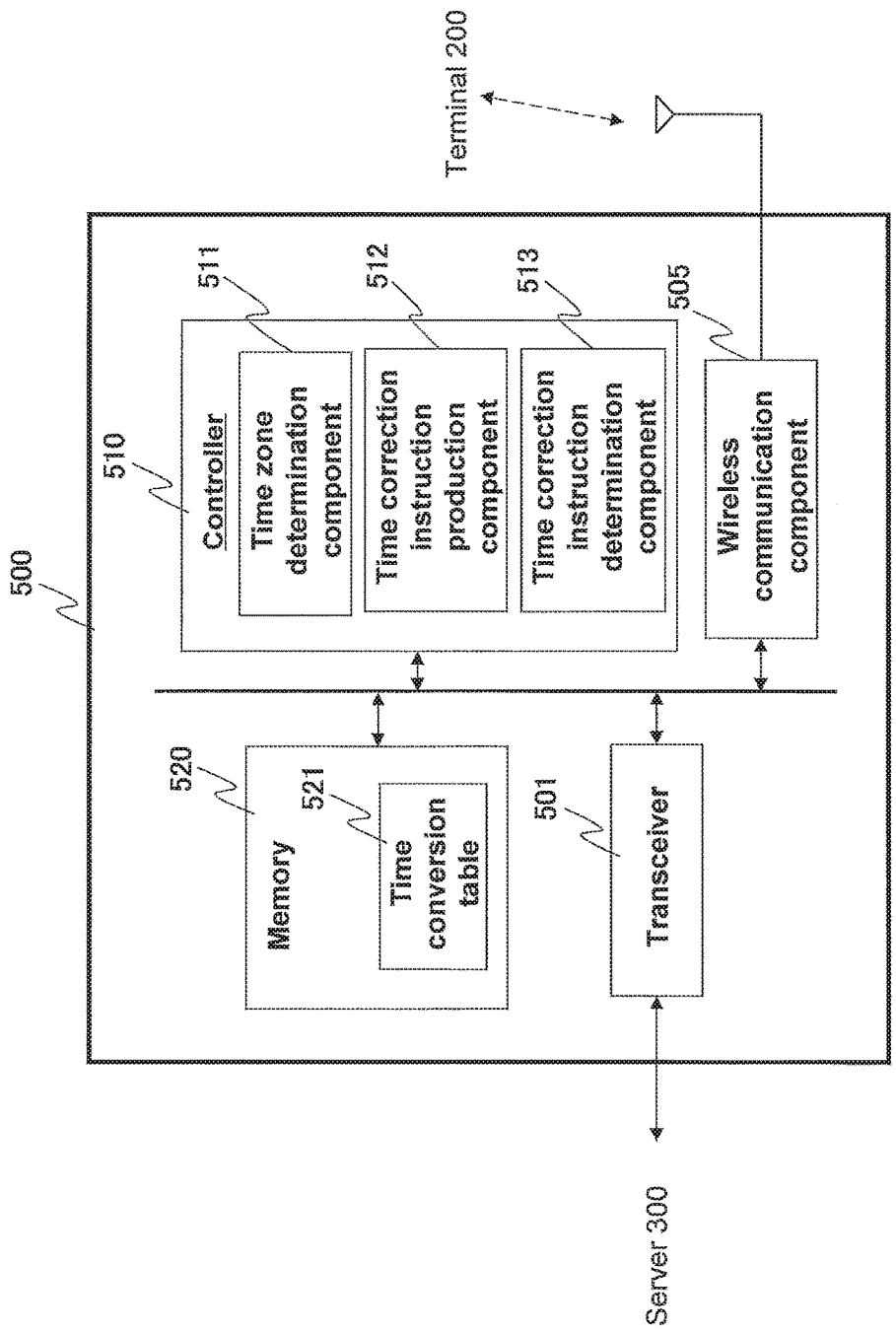
FIG. 10 is a diagram of the simplified configuration of a base station.

As shown in FIG. 10, the base station 500 is a communication device that comprises a transceiver 501, a controller 510 (an example of a controller), a memory 520, a wireless communication component 505 (an example of a communication component), and so forth, which are connected via a specific bus. The controller 510 includes a CPU or other processor, and executes a specific program. In particular, the controller 510 executes the automatic time correction processing pertaining to this embodiment by executing the function of a time zone determination component 511 and a time correction instruction production component 512, just as in Embodiment 1, and by executing the function of a time correction instruction determination component 513. The memory 520 stores various kinds of data, such as the communication status of the device, and information about connection to other communication devices. The memory 520 also holds a time conversion table 521, just as in Embodiment 1.

2-2. Operation

Figure 11:
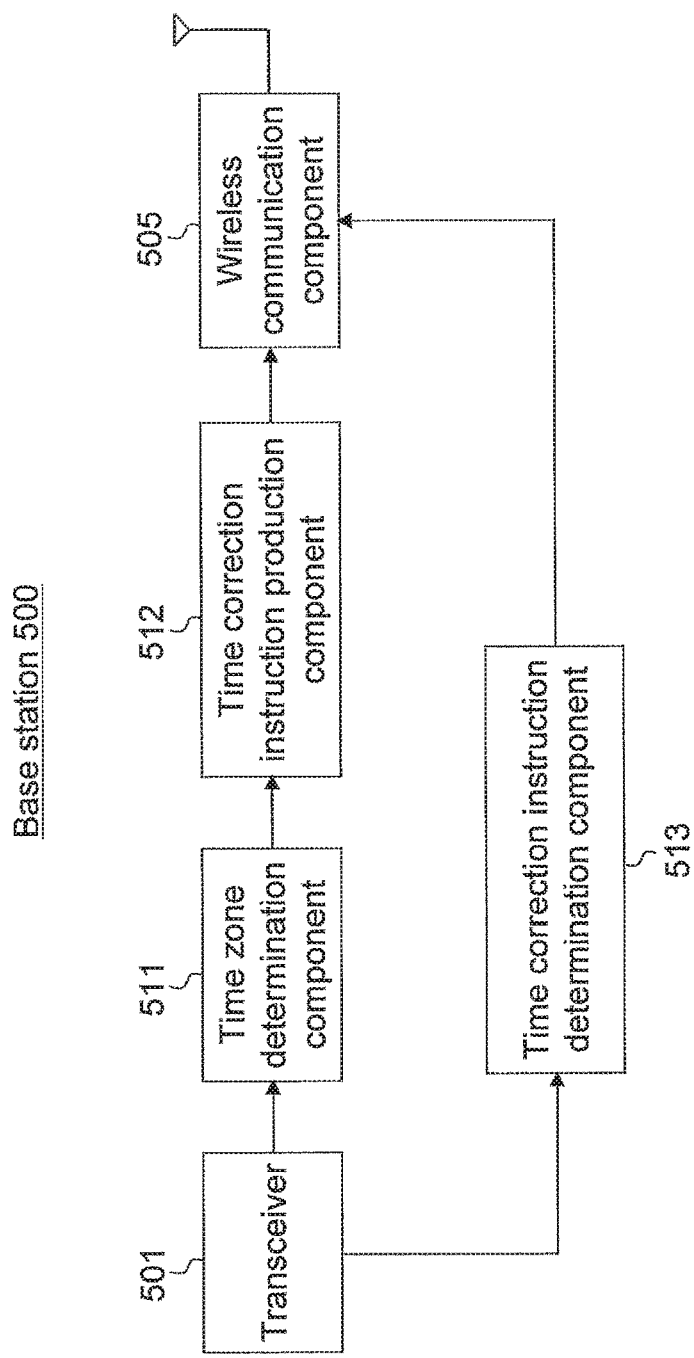
FIG. 11 is a functional block diagram of the base station.

FIG. 11 is a functional block diagram of the base station 500 pertaining to Embodiment 2. As shown in FIG. 11, the base station 500 executes the functions of the transceiver 501, the time zone determination component 511, the time correction instruction production component 512, the wireless communication component 505, and the time correction instruction determination component 513.

Just as in Embodiment 1, the transceiver 501 receives destination information about the aircraft 1 from the server 300. The destination information includes information specifying the destination of the aircraft 1. The received destination information is output to the time zone determination component 511. The transceiver 501 also receives service (flight) information for the aircraft 1 (such as cruising altitude information about the aircraft) from the server 300, and outputs it to the time correction instruction determination component 513.

Just as in Embodiment 1, for the received destination information, the time zone determination component 511 refers to the time conversion table 521 held in the memory 520, and outputs the time zone and Daylight Saving Time adjustment for the destination of the aircraft 1 to the time correction instruction production component 512.

Just as in Embodiment 1, the time correction instruction production component 512 produces an IE defined by the (NITZ), and outputs it as a time correction instruction to the wireless communication component 505.

Meanwhile, the time correction instruction determination component 513 switches between transmission and non-transmission of the time correction instruction at the wireless communication component 505 on the basis of the received service information (such as on the basis of whether or not the cruising altitude of the aircraft 1 has reached a predetermined altitude). That is, the wireless communication component 505 sends a time correction instruction to the terminal 200 if the time correction instruction determination component 513 has determined that the cruising altitude of the aircraft 1 has exceeded a predetermined altitude (such as 10,000 meters), for example. On the other hand, the wireless communication component 505 does not send a time correction instruction if the time correction instruction determination component 513 has determined that the cruising altitude of the aircraft 1 has not exceeded the predetermined altitude.

If no time correction instruction is sent, the produced correction instruction may be deleted, or it may be stored in the memory 520. The base station 500 sends the terminal 200 the time correction instruction read from the memory 520, or a correction instruction that has been produced again, when service information about the aircraft 1 is received from the server 300 again, and it has been determined that the cruising altitude of the aircraft 1 has reached a predetermined altitude.

2-3. Modification Example 2-3-1. Timing of Determination of Whether Time Correction Instruction can be Sent The determination by the time correction instruction determination component 513 as to whether or not to send a time correction instruction may be performed after destination information has been received by the transceiver 501 from the server, and before the time zone is determined by the time zone determination component 511. In this case, if the time correction instruction determination component 513 determines against transmission, the functions of the time zone determination component 511 and the time correction instruction production component 512 are not executed.

2-3-2. Transmission of Time Correction Instruction

In this embodiment, before the aircraft 1 reaches a predetermined altitude, the base station 500 in the aircraft 1 does not send a time correction instruction to the terminal 200 in the aircraft 1. However, if the aircraft 1 is at a low altitude, such as before departure or immediately after departure, a time correction instruction may be sent as long as it is the same as at the ground base station 400 in the departure region. Therefore, before the aircraft 1 reaches a predetermined altitude, the base station 500 in the aircraft 1 may "send an instruction to correct to the time at the departure site" to the terminal 200 in the aircraft 1, instead of "not sending a time correction instruction."

If "send an instruction to correct to the time at the departure site" applies, the same processing is performed as the processing to produce an instruction to correct to the time at the destination. Detailed description on the processing will be given below.

Step 1: The controller 510 acquires departure site information (such as Tokyo) from the server 300 via the transceiver 501, in addition to destination information for the aircraft 1.

Step 2: The controller 510 (the time zone determination component 511) refers to the memory 520, and uses the time conversion table 521 for the time zone and Daylight Saving Time adjustment corresponding to each region to select "UTC +9" (Universal Coordinated Time+9 hours) as the time zone corresponding to the departure site Tokyo.

Step 3: The controller 510 (the time zone determination component 511) acquires the Daylight Saving Time adjustment corresponding to the departure site. Here, it is assumed that the Daylight Saving Time adjustment corresponding to the departure site Tokyo is "+0 hours."

Step 4: The controller 510 (the time zone determination component 511) totals up the time zone and the Daylight Saving Time adjustment to calculate the time zone (including Daylight Saving Time adjustment) corresponding to the departure site Tokyo, which will be "UTC +9," and sets this as the time zone.

Step 5: The controller 510 (the time correction instruction production component 512) produces a time correction instruction defined by NITZ on the basis of the time zone (including the Daylight Saving Time adjustment) of the departure site determined by the time zone determination component 511.

Step 6: The controller 510 sends the time correction instruction thus produced through the wireless communication component 505 to the connected terminal 200.

2-3-3. Criteria for Determining Whether to Send Correction Instruction

The criterion used by the time correction instruction determination component 513 to determining whether to transmit is not limited to the cruising altitude of the aircraft 1.

After departure, the cruising altitude of the aircraft 1 is raised along with a cruising speed. At the same time, the aircraft moves away from the departure region. Accordingly, the timing at which the base station 500 in the aircraft 1 sends a correction instruction to correct to the time at the destination region may be (1) "after the aircraft has reached a predetermined speed," (2) "after the aircraft has flown a predetermined distance," (3) "after a predetermined length of time has elapsed since the departure," or (4) "after the aircraft has moved a predetermined distance away from the departure region," instead of the "after the aircraft has reached a predetermined altitude" as in this embodiment. Also, since the main issue is that the mobile phone network developed in the country of the departure region not be affected, the timing for sending a correction instruction to correct to the time at the destination region may also be (5) "after the aircraft has left a certain area (such as the territory, territorial waters, or airspace of the country where the departure region is)," or (6) "after the strength of the signal received from a ground base station has dropped under a predetermined value," instead of the "after the aircraft has reached a predetermined altitude."

The above situations (1) to (6) will now be described.

In situation (1), the transceiver 501 receives cruising speed information as service information about the aircraft 1. In general, the aircraft 1 takes off at a speed of 250 to 300 km/h, and the aircraft levels off at a speed of about 800 km/h. Accordingly, the base station 500 installed in the aircraft 1 only sends a terminal 200 carried in the aircraft 1 an instruction to correct to the time of the destination when the aircraft 1 has taken off and has reached a predetermined speed (such as a speed of 800 km/h).

In situation (2), the transceiver 501 receives cruising distance information as service information about the aircraft 1. In general, the aircraft 1 rises at an angle of 3 to 7 degrees, and levels off at an altitude of 10,000 meters. For example, the cruising distance until an altitude of 10,000 meters is reached when the aircraft rises at an angle of 5 degrees is roughly 115 km (calculated as 10 km/sin(5)). Accordingly, the base station 500 installed in the aircraft 1 only sends a terminal 200 carried in the aircraft 1 an instruction to correct to the time of the destination when the aircraft 1 has taken off and has flown a predetermined distance (such as 115 km).

In situation (3), the transceiver 501 receives cruising time information as service information about the aircraft 1. For instance, if it takes 20 minutes until the aircraft levels off, then the base station 500 installed in the aircraft 1 only sends a terminal 200 carried in the aircraft 1 an instruction to correct to the time of the destination when 20 minutes has elapsed since departure. Alternatively, departure time information may be received as service information about the aircraft 1, in which case the base station 500 installed in the aircraft 1 only sends a terminal 200 carried in the aircraft 1 an instruction to correct to the time of the destination when 20 minutes has elapsed since the departure time.

In situation (4), the transceiver 501 receives position information as service information about the aircraft 1. Also, the base station 500 holds position information about various airports. The base station 500 may also receive position information about various airports from an external device. The base station 500 installed in the aircraft 1 only sends a terminal 200 carried in the aircraft 1 an instruction to correct to the time of the destination when a predetermined radius has been exceeded from the position of each airport.

In situation (5), the transceiver 501 receives position information as service information about the aircraft 1. Also, the base station 500 holds position information about a boundary at which switching control is performed (such as the territorial waters of Japan). The base station 500 may also receive position information about boundaries from an external device. The base station 500 installed in the aircraft 1 only sends a terminal 200 carried in the aircraft 1 an instruction to correct to the time of the destination when a predetermined boundary has been crossed.

In situation (6), an instruction to correct to the time of the destination is sent according to the electric field strength from the ground base station 400, that is, the received signal strength. For example, if the electric field strength is under a predetermined value, the base station 500 in the aircraft 1 sends the terminal 200 in the aircraft 1 an instruction to correct to the time of the destination.

Figure 12:
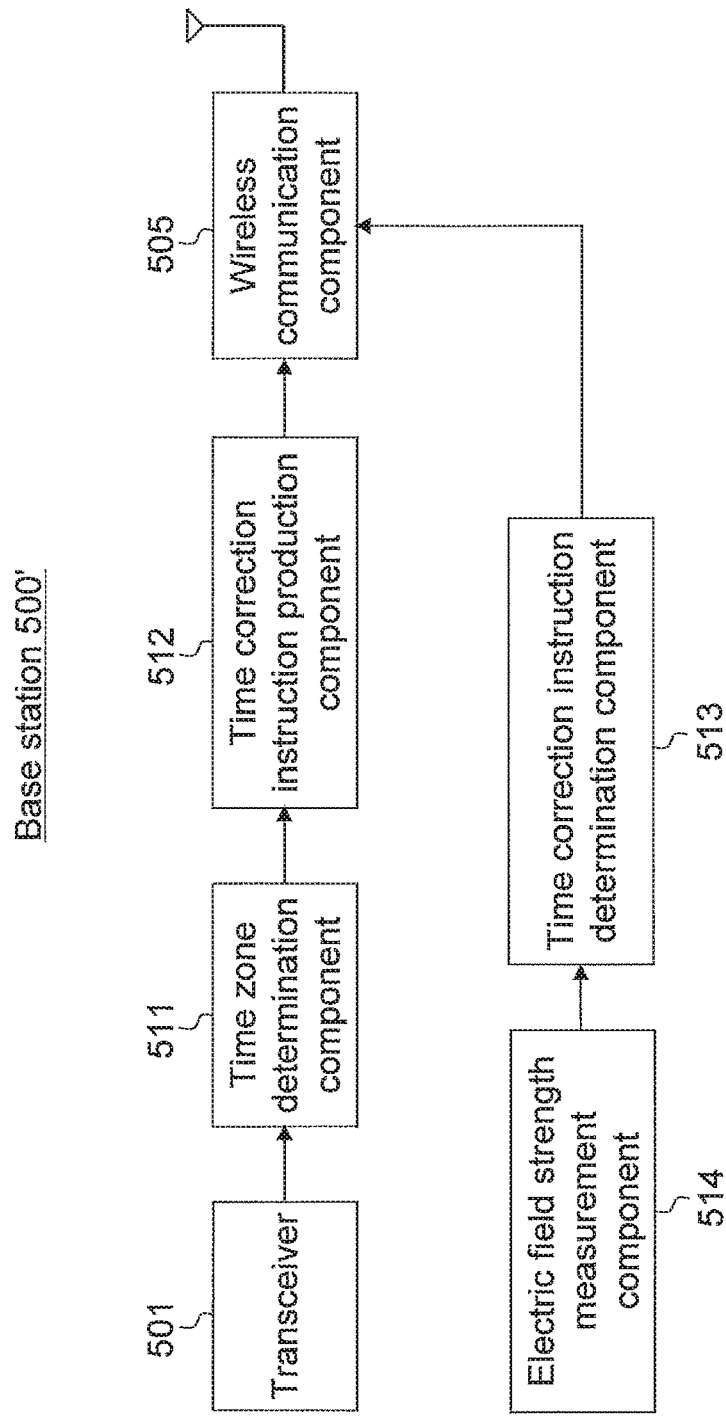
FIG. 12 is a functional block diagram of the base station pertaining to a modification example.

The electric field strength may be measured directly by the base station 500. In this case, as shown in FIG. 12, a base station 500' is equipped with an electric field strength measurement component 514, and the measurement result is output to the time correction instruction determination component 513. The time correction instruction determination component 513 uses the measurement result to determine whether or not a time correction instruction should be sent.

The electric field strength information may be received from an external device, or it may be sent from the terminal 200 to the base station 500.

In the above situations (1) to (6), the time correction instruction determination component 513 of the base stations 500 and 500' sends the terminal 200 an instruction to correct to the time of the destination via the wireless communication component 505 when a predetermined threshold has been exceeded.

After the predetermined threshold has been exceeded, if the value drops back under the predetermined threshold, the time correction instruction determination component 513 may or may not send an instruction to correct to the time of the destination.

Also, the above situations (1) to (6) may allow the transmission of a time correction instruction if two or more conditions are met.

2-4. Effects, Etc.

As discussed above, in addition to the effect of Embodiment 1, the configuration according to Embodiment 2 prevents such a problem that the time displayed on the terminal 200 in the aircraft 1 or on the terminal 200a outside the aircraft 1 is switched frequently, which can confuse the users of the terminal 200 and the terminal 200a.

Embodiment 3

Embodiment 3 will now be described through reference to FIGS. 13 to 17.

Figure 13:
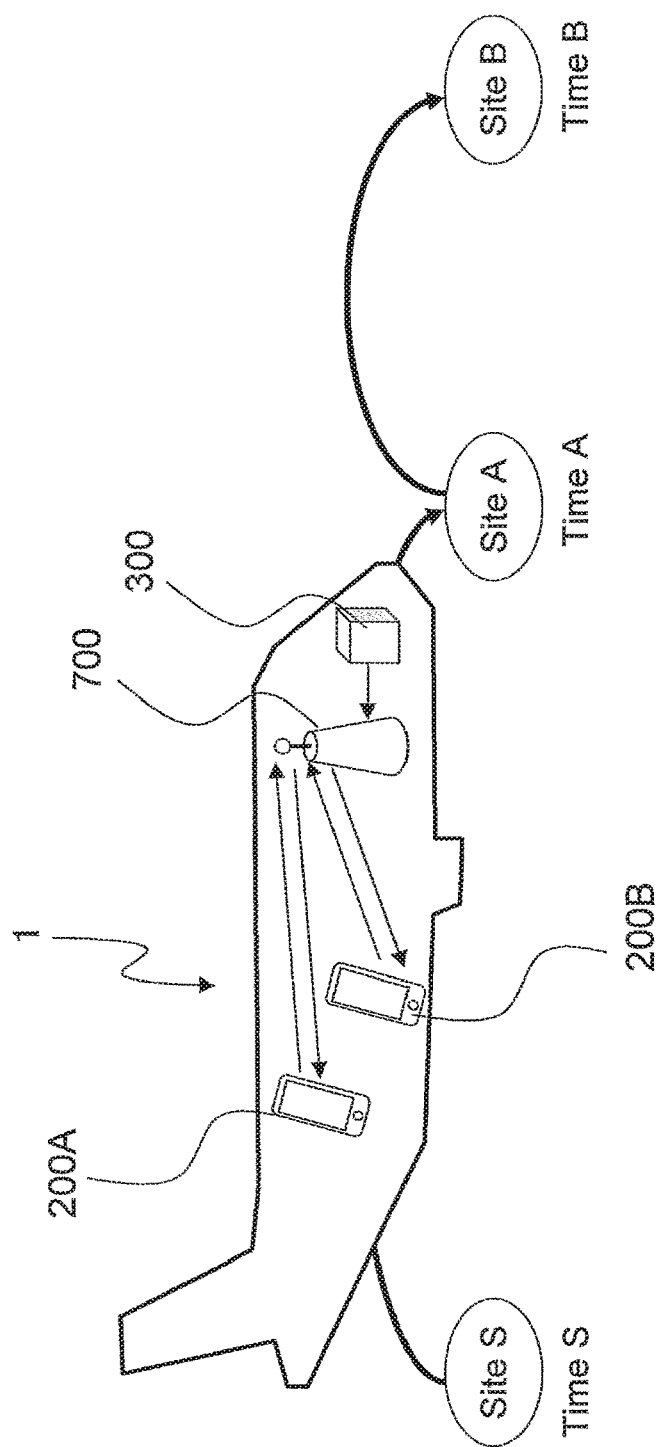
FIG. 13 is a simplified diagram of an in-flight system.

FIG. 13 is a diagram of the aircraft 1 that includes a base station 700 pertaining to Embodiment 3.

In Embodiment 3, the aircraft 1 has at least one stopover site on the way to the final destination. The user of a first terminal 200A, whose destination is a stopover site, and the user of a second terminal 200B, whose destination is the final destination of the aircraft 1, are both on board the aircraft 1. The base station 700 corrects the time set on the first terminal 200A to the time of the stopover site, and corrects the time set on the second terminal 200B to the time of the final destination.

Those elements having the same configuration and function as in Embodiment 1 will be numbered the same and referred to in the same drawings, and will not be described again in detail. In the following description, when there is no need to distinguish between the first terminal 200A and the second terminal 200B, they will both be referred to as a terminal 200.

3-1. Configuration

Figure 14:
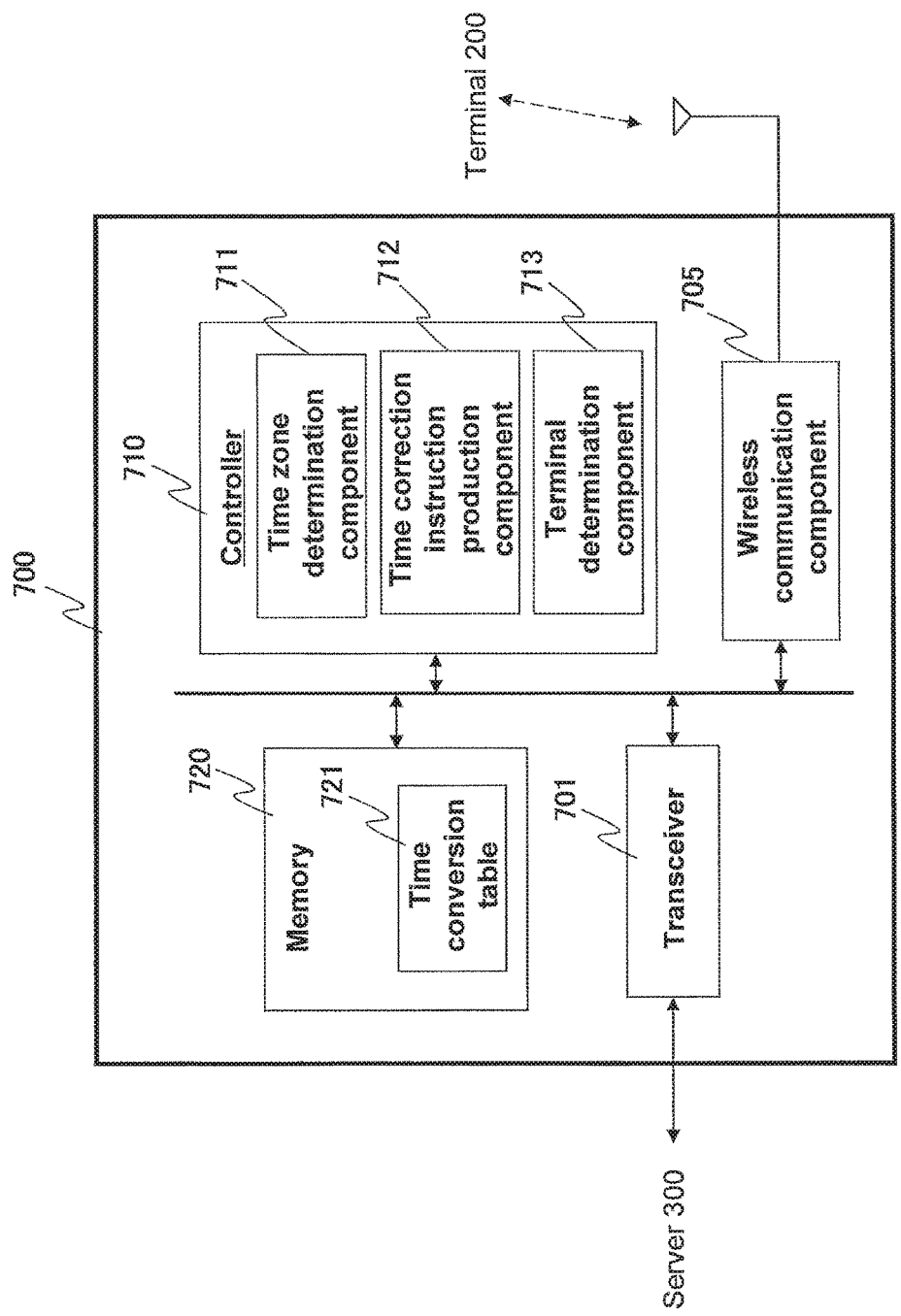
FIG. 14 is a diagram of the simplified configuration of a base station.

As shown in FIG. 14, the base station 700 is a communication device that comprises a transceiver 701, a controller 710 (an example of a controller), a memory 720, a wireless communication component 705 (an example of a communication component), and so forth, which are connected via a specific bus. The transceiver 701 is connected to the server 300. The controller 710 includes a CPU or other processor, and executes a specific program. In particular, the controller 710 executes an automatic time correction processing pertaining to this embodiment by executing the function of a time zone determination component 711 and a time correction instruction production component 712, just as in Embodiment 1, and by executing the function of a terminal determination component 715, which will be discussed below. The memory 720 stores various kinds of data, such as the communication status of the device, and information about connection to other communication devices, and also holds a time conversion table 721, just as in Embodiment 1, as well as destination information for each terminal (discussed below).

3-2. Operation

Figure 15:
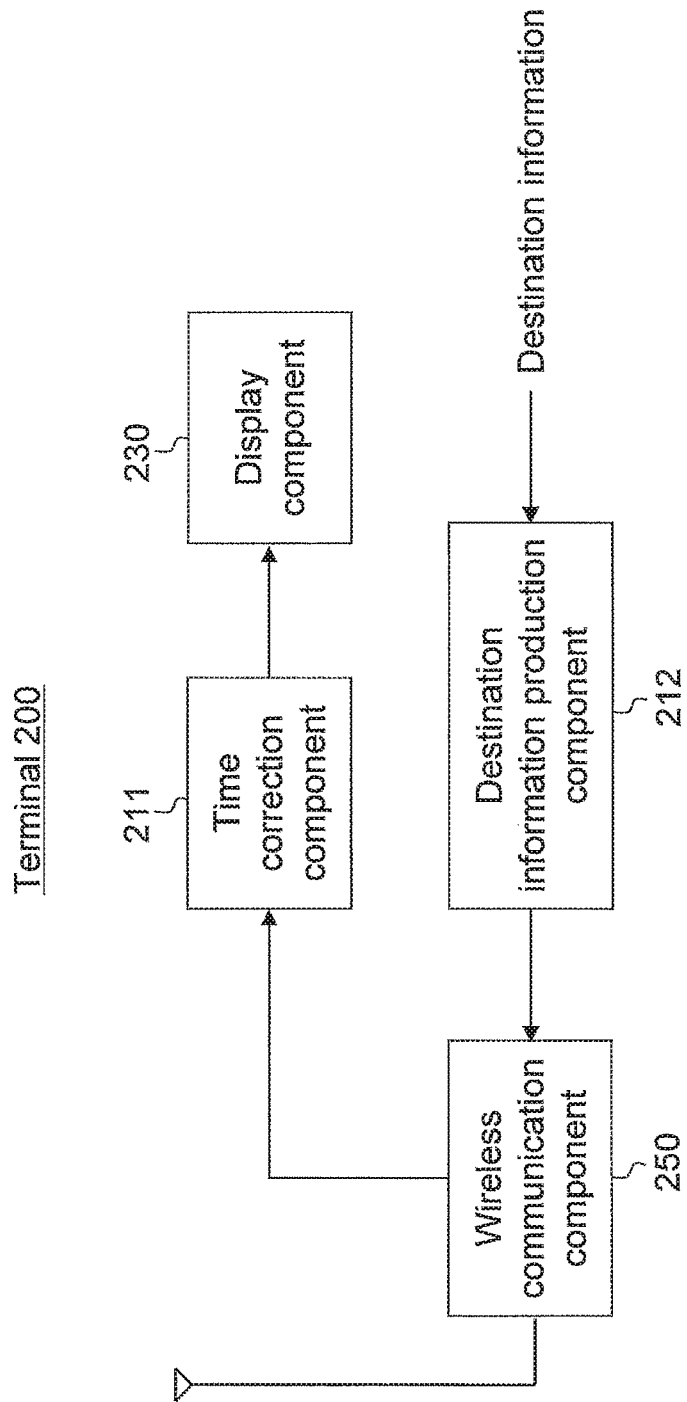
FIG. 15 is a functional block diagram of a terminal.
Figure 16:
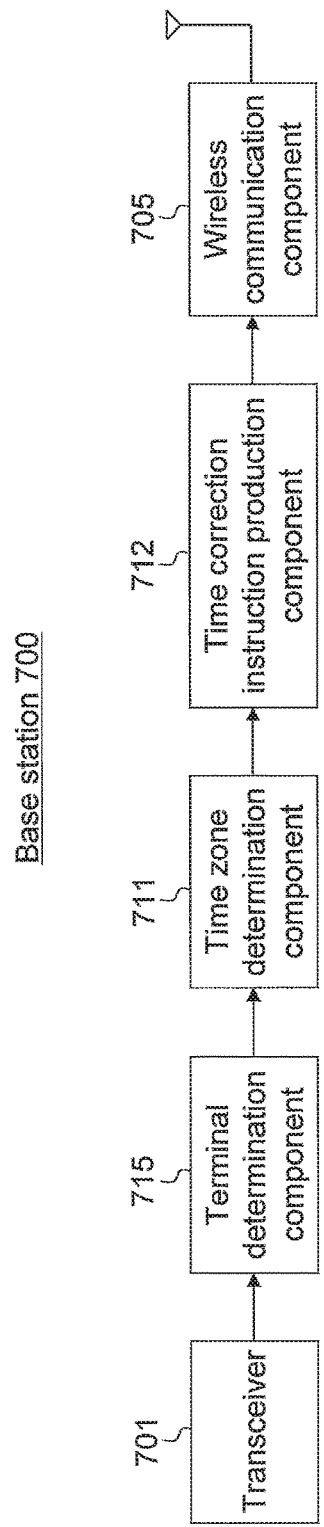
FIG. 16 is a functional block diagram of the base station.

FIG. 15 is a functional block diagram of the terminal 200 in Embodiment 3. FIG. 16 is a functional block diagram of the base station 700 pertaining to Embodiment 3.

In FIG. 15, just as in Embodiment 1 shown in FIG. 5, the terminal 200 has the controller 210, the memory 220, the display component 230, the input component 240, and the wireless communication component 250. In this embodiment, the terminal 200 further includes a destination information production component 212 whose function is executed by the controller 210. The operation of the destination information production component 212 will be discussed later.

In FIG. 16, the base station 700 has the transceiver 701, the terminal determination component 715, the time zone determination component 711, the time correction instruction production component 712, and the wireless communication component 705.

Figure 17:
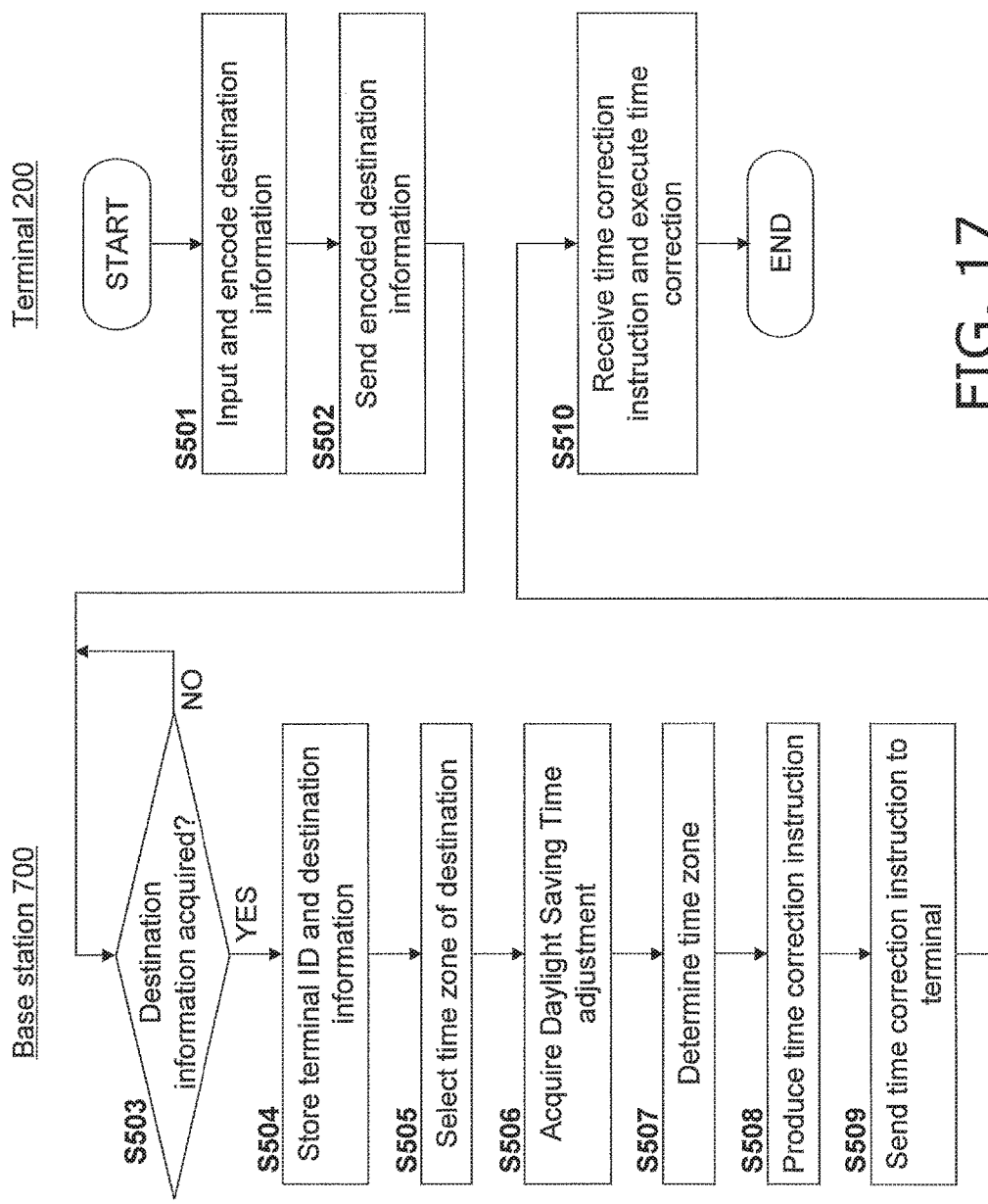
FIG. 17 is a flowchart of the operation of the base station and terminal.

The operation of the terminal 200 and the base station 700 shown in FIGS. 15 and 16 will now be described through reference to FIG. 17.

Step S501: At the terminal 200, the user inputs destination information, and the input destination information is encoded by the destination information production component 212.

Step S502: The wireless communication component 250 of the terminal 200 sends the encoded destination information to the base station 700 in the aircraft.

Step S503: The transceiver 701 of the base station 700 receives the destination information from the terminal 200.

Step S504: When the controller 710 (terminal determination component 715) of the base station 700 receives destination information from the plurality of terminals 200A and 200B, each piece of destination information is stored in the memory 720 so as to be associated with ID information for each terminal. For example, the destination information corresponding to the terminal 200A is stored as site A, which is a stopover site, and the destination information corresponding to the terminal 200B is stored as site B, which is the final destination.

Steps S505 to S508: The time zone determination component 711 of the controller 710 determines the time zone for every terminal stored in the memory 720. Thereafter, a time correction instruction is produced by the same process as in Embodiment 1 (steps S102 to S105 in FIG. 7) for every terminal 200.

Step S509: The wireless communication component 705 sends the corresponding terminal 200 the time correction instruction thus produced.

Step S510: The wireless communication component 250 of the terminal 200A receives an instruction to correct to the time corresponding to site A, which is a stopover site, from the base station 700, and the time correction component 211 of the controller 210 corrects the current time to the time at site A, just as in Embodiment 1. Meanwhile, the wireless communication component 250 of the terminal 200B receives an instruction to correct to the time corresponding to site B, which is the destination, from the base station 700, and the time correction component 211 of the controller 210 corrects to the time at site B, just as in Embodiment 1.

In Embodiment 3, the destination information sent by the terminal 200 is not limited to the destination of the aircraft 1, and may be the final destination of the user of the terminal 200. For example, there may be a case in which the user of the terminal 200B departs site S on the aircraft 1 in which the base station 700 is installed as shown in FIG. 13, stops over in site A, and then arrives at site B on a different aircraft from the aircraft 1. Here, the destination information sent by the first terminal 200A will be site A, and the time correction instruction sent by the base station 700 to the first terminal 200A will be an instruction to correct to the time A at site A. Meanwhile, the destination information sent by the second terminal 200B will be site B, and the time correction instruction sent by the base station 700 to the second terminal 200B will be an instruction to correct to the time B at site B.

3-3. Modification Example

The user carries and uses the terminal 200 in the aircraft 1 to send destination information ahead of time to the base station 700, but the transmission of destination information from the terminal 200 may be done after connection to the base station 700 in the aircraft 1, or may be done outside the aircraft 1, going from the server 300, through a network, to the base station 700.

Also, in Embodiment 3, the wireless communication component 705 received destination information from the terminal 200, but this is not the only option. For example, the base station 700 may store destination information in the memory 720 ahead of time. In this case, for instance, destination information may come from reservation information (in addition to destination information, it may include ID information about the user (passenger), or ID information about the terminal 200) or the like stored in the airline ticket reservation system operated by the company owning the aircraft 1, and may be sent through a network ahead of time to the base station 700. In this case, there is no need to send destination information from the terminal 200 inside the aircraft 1.

Also, when destination information is sent from the terminal 200, boarding information (reservation number, airline ticket number, seat number, etc.) may be input instead of inputting destination information. In this case, when the boarding information is sent to the base station 700, the base station 700 may acquire destination information on the basis of reservation information and so forth acquired via the server 300.

3-4. Effects, Etc.

As discussed above, with Embodiment 3, in addition to the effects of Embodiment 1, the base station 700 sends an instruction to correct to the time corresponding to the destination, which varies for each terminal 200. Consequently, the base station 700 can automatically correct the time displayed on the terminal 200 of a user to the time at the destination, which varies for each user. That is, regardless of where the aircraft 1 is heading, the time of the terminal 200 can be corrected to the time of the destination of the user of that terminal 200.

Other Embodiments (1)

In the above embodiments, the wireless communication component of each base station communicated wirelessly via an antenna, but an antenna port can similarly be used.

The term "antenna port" refers to a theoretical antenna made up of one or more physical antennas. Specifically, "antenna port" may not necessarily refer to one physical antenna, and may instead refer to an array antenna made up of a plurality of antennas.

For instance, in LTE (long term evolution), how many physical antennas make up an antenna port is not specified, and this is specified as the minimum unit at which a base station can send different reference signals.

Also, an antenna port is sometimes specified as the minimum unit for multiplying the weighting of a precoding vector.

(2)

The functions of the base stations 100, 500, and 700 (and particularly the controllers 110, 510, and 710) in the above embodiments may be provided to the server 300 (an example of a communication device), which is a computer device. In this case, the server 300 is a computer device having the same configuration as that shown in FIGS. 2, 10, and 14 (except for the wireless communication component), and its controller determines the time zone (including Daylight Saving Time adjustment) and produces instructions to correct to the destination time. The time correction instructions thus produced are sent from a transceiver, through a base station, to each terminal 200.

Also, the server 300 and the base stations 100, 500, and 700 may be devices (an example of communication devices) that are integrated.

(3)

In the above embodiments, a system installed in the aircraft 1 was given as an example, but this is not the only option. The above embodiments can also be applied to any mobile body serving as a means of transportation for the movement of people, such as automobiles and ships.

(4)

In the above embodiments, the base station or server (communication device) is not limited to being constituted solely by hardware, and can also be realized by software in conjunction with hardware.

Also, the various functional blocks used in describing the above embodiments are typically in the form of integrated circuits. These may be individually made into chips, or some or all of them may be included on one chip. The concept of "integrated circuit" here is sometimes referred to as an IC, system LSI, super LSI, or ultra LSI, depending on the degree of integration.

The method for producing the integrated circuit is not limited to LSI, and may instead involve a dedicated circuit or a multipurpose processor. After LSI manufacture, an FPGA (field programmable gate array) that allows programming, or a reconfigurable processor that allows the reconfiguration of settings or connection of circuit cells inside the integrated circuits may be utilized.

Furthermore, if some technique for circuit integration should appear that replaces LSI, either by the advance of semiconductor technology or by a separate technology derived from this, that technology may be used to integrate the functional blocks. The application of biotechnology or the like is also conceivable.

(5)

Some or all of the above embodiments may be combined. For instance, it is possible to combine Embodiment 2 with Embodiment 3.

(6)

The order in which the processing steps are executed in the above embodiments is not necessarily limited to what was discussed in the above embodiments, and the execution order can be changed to the extent that this does not depart from the gist of the invention.

(7)

The present invention is not limited to being a communication device or communication system in the above embodiments, and can instead be an automatic time correction method.

(8)

As discussed above, embodiments were described as examples of the technology disclosed herein. The appended drawings and detailed description were provided to that end.

Therefore, the constituent elements illustrated in the appended drawings and discussed in the detailed description can encompass not only those constituent elements which are essential to solving the problem, but also constituent elements that are not essential to solving the problem, and are given to illustrate the above-mentioned technology. Accordingly, just because these non-essential constituent elements are illustrated in the appended drawings and discussed in the detailed description, it should not be concluded that these non-essential constituent elements are essential.

Also, the above embodiments were given to illustrate examples of the technology disclosed herein, so various modifications, substitutions, additions, omissions, and so forth can be made within the scope of the appended claims or equivalents thereof.

The present invention is useful in mobile communication systems and the like.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the communication device for mobile body, communication system for mobile body, and automatic time correction method featuring communication device for mobile body. Accordingly, these terms, as utilized to describe the technology disclosed herein should be interpreted relative to the communication device for mobile body, communication system for mobile body, and automatic time correction method featuring communication device for mobile body.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A communication device to be provided in a mobile body which is a means of transportation, the communication device configured to communicate with one other communication device, said communication device comprising:
    a communication component configured to connect to the one other communication device; and
    a processor programmed to control the communication component,
    the processor programmed to
        acquire regional information indicating a destination of the mobile body;
        determine third time zone information corresponding to the regional information indicating that the destination is located in a third time zone with respect to a first time zone of a departure site, a second time zone positioned between the first time zone and the third time zone;
        produce a time correction instruction according to the third time zone information including the regional information of the destination located in the third time zone with respect to the first time zone of the departure site; and
        transmit the time correction instruction through the communication component to the one other communication device, wherein the communication component is configured to connect to a plurality of user communication devices, and
    the processor is programmed to
        acquire first user regional information indicating a destination of a first user of a first user communication device and second user regional information indicating a destination of a second user of a second user communication device;
        determine first user time zone information corresponding to the first user regional information, and second user time zone information corresponding to the second user regional information;
        produce a first user time correction instruction according to the first user time zone information, and a second user time correction instruction according to the second user time zone information;
        transmit the first user time correction instruction through the communication component to the first user communication device; and
        transmit the second user time correction instruction through the communication component to the second user communication device.

2. The communication device according to claim 1, wherein
    the time correction instruction is an instruction to correct a current time of the one other communication device at the third time zone.

3. The communication device according to claim 2, wherein
    the processor is programmed to acquire flight information including the regional information indicating the destination from a server in the mobile body.

4. The communication device according to claim 1, wherein
    the processor is programmed to transmit the time correction instruction to the other communication device when the mobile body is located in the first time zone of the departure site.

5. The communication device according to claim 1, wherein
    the processor is programmed to produce the time correction instruction including a daylight saving time adjustment corresponding to the destination.

6. The communication device according to claim 1, wherein
    the communication component is configured to connect to a display component,
    the processor is programmed to transmit both a current time corresponding to the first time zone of the departure site and a corrected time corresponding to the third time zone of the destination to the display component, and
    the display component is configured to display both the current time and the corrected time.

* * * * *